Feb. 21, 1950 G. LEVESQUE DU ROSTU 2,498,438
VARIABLE LOAD BRAKE
Filed July 18, 1945 2 Sheets-Sheet 1
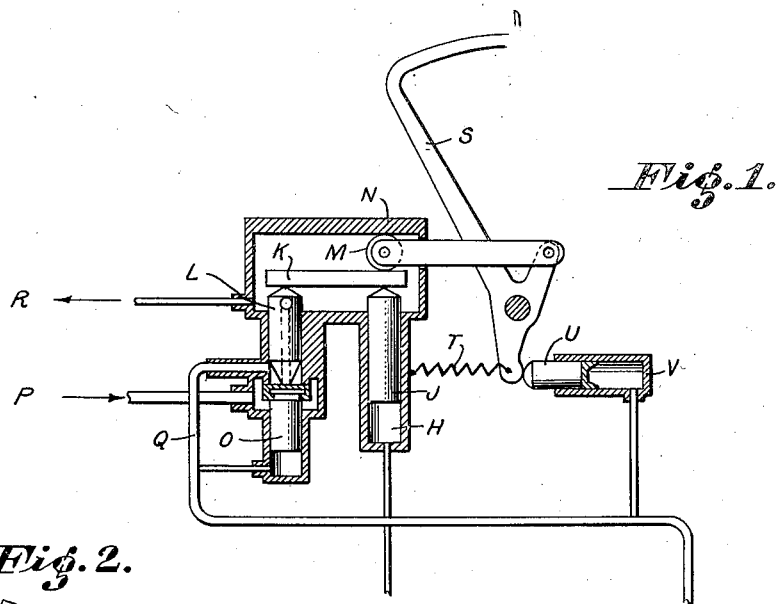
Fig. 1.
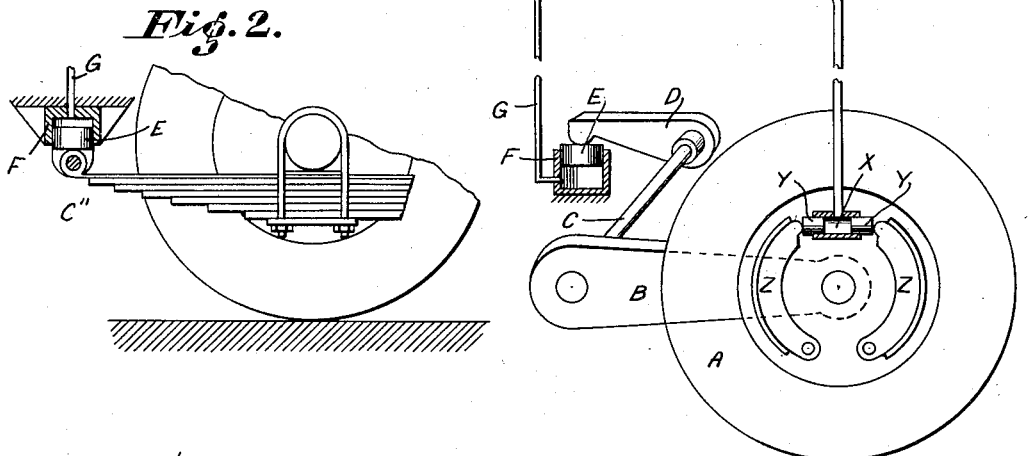
Fig. 2.
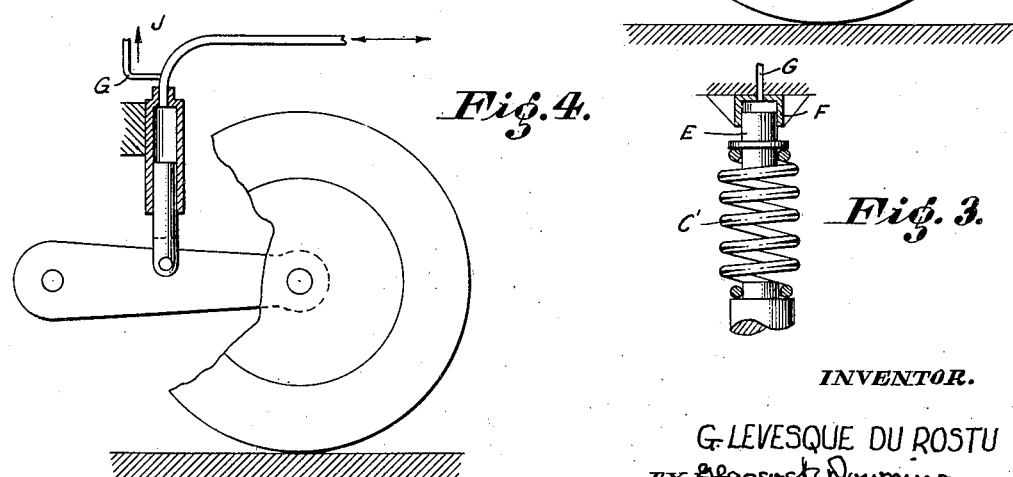
Fig. 4.
Fig. 3.
INVENTOR.
G. LEVESQUE DU ROSTU
BY Glascock Downing
+ Seebold
ATTORNEYS.

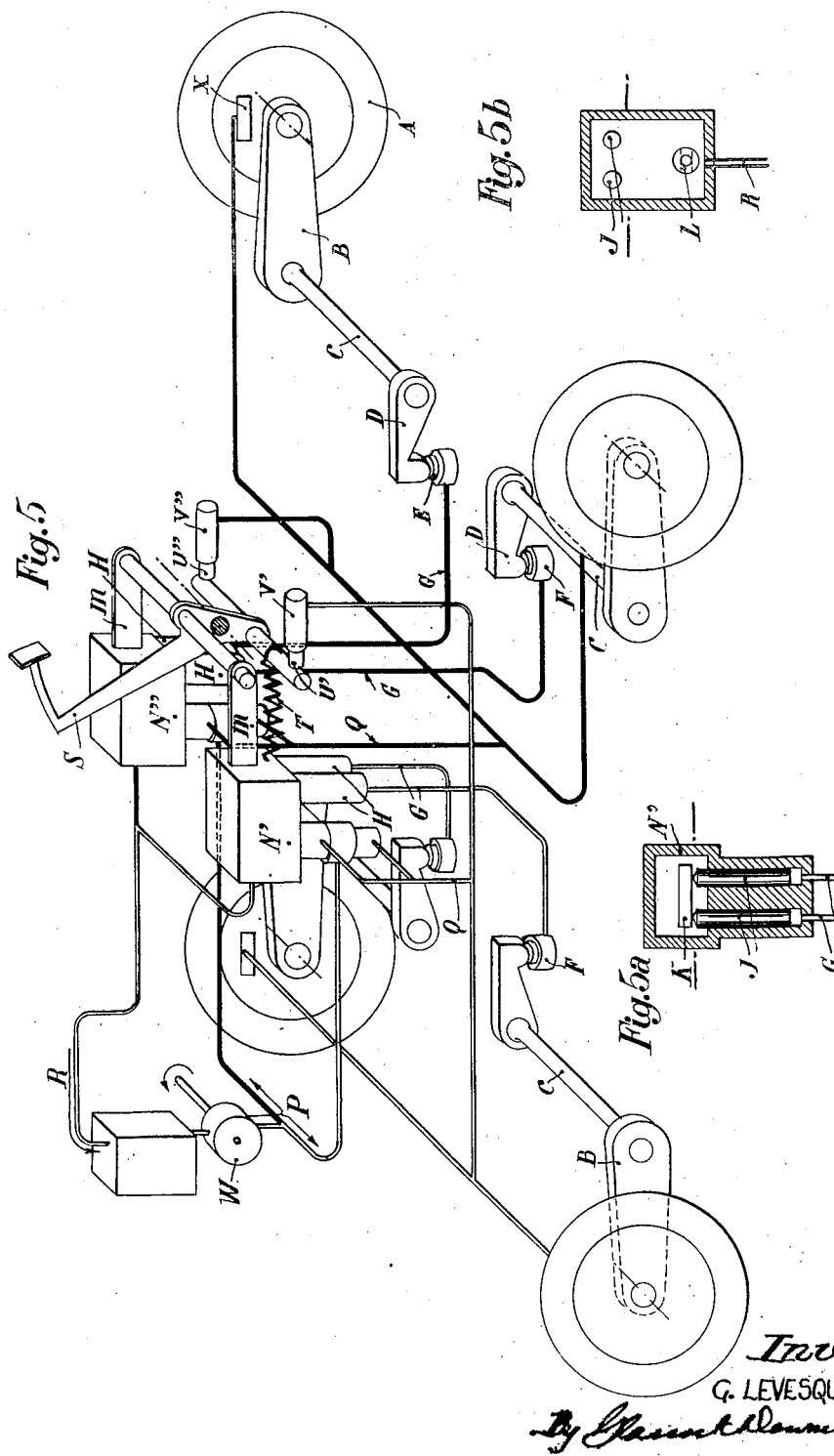

Patented Feb. 21, 1950

2,498,438

UNITED STATES PATENT OFFICE 2,498,438

VARIABLE LOAD BRAKE

Georges Levesque du Rostu, Paris, France, assignor to Societe Anonyme Andre Citroen, Paris, France Application July 18, 1945, Serial No. 605,687
In France July 18, 1941

Section 1, Public Law 690, August 8, 1946
Patent expires July 18, 1961

5 Claims. (Cl. 188—195)

One of the big problems in the art of braking consists in distributing the braking action to the vehicle wheels proportionally to the instantaneous loads supported by the wheels. For solving this problem several brake-systems have already been proposed having for their object to create variations in lever arms pertaining to the vehicle brake-operating means, or in fluid pressures acting either upon said means or directly upon brake-jaws. Variations in the lever arms or fluid pressures in said brake-systems are controlled by displacements of the vehicle underframe with respect to the wheels, such displacements usually being dependent on the loads supported by the wheel or the axle under consideration.

The principle of the invention as hereinafter set forth departs from that of the aforementioned brake-systems, in that it is the reaction of suspended parts upon the vehicle underframe that permits control of the fluid pressure employed for transmitting the braking force proportionally to the load supported.

Consequently, the brake-system according to this invention consists in transmitting the reactive action of the spring gear upon the underframe to a device designed for regulating a pressure (or an underpressure) proportionally to the said force i. e., to the load supported by the vehicle wheel.

Fig. 1 diagrammatically shows a brake-system embodying the principle of the invention. There are shown one single vehicle wheel and one single regulating device hereinafter called "proportioner." The suspension gear in this embodiment is constituted by a torsion bar. For the sake of clarity, the proportioner is shown to enlarged scale as compared to the remainder of the embodiment.

Figs. 2 and 3 are diagrammatic views of a suspension gear constituted by leaf or helical springs.

Fig. 4 shows the suspension as obtained by means of a fluid.

Fig. 5 is a perspective view showing the application of the system illustrated in Fig. 1 to the braking of the four wheels of an automobile.

Figs. 5a and 5b are a vertical and a horizontal cross section of one of the proportioners N' N''.

Fig. 6 is a diagrammatic view of a modification.

As shown in Fig. 1, the vehicle wheel A is connected with the underframe by means of an arm B fast to a torsion bar C. One end of bar C carries a lever D that bears upon a piston E slidably received in a cylinder F. The latter is adapted to communicate through a small pipe G with a cylinder of smaller cross-section H pertaining to the proportioner and including a piston J. The space comprised between the pistons E and J is filled with a liquid.

The piston J bears on one end of a free lever K whose other end bears upon an additional piston L. The pivot point of lever K is constituted by the movable roller M bearing upon the cover plate N.

The piston L when pushed opens a balanced valve O designed to direct the flow of pressure fluid towards the point or points of its utilisation. Conversely, when moved in the reverse direction, said piston L allows the fluid to escape.

The pipe P serves for introducing the liquid under a pressure which should be at least equal to the maximum pressure of operation.

Pipe Q serves to connect the proportioner with operating means which, in the example selected, are a cylinder X with its two pistons Y adapted to act upon the brake-jaws Z as in a conventional liquid-operated brake-mechanism.

R designates the release and return pipe for the liquid.

Displacements of the roller M are controlled by means of a brake-pedal S which also controls the proportioners for other vehicle wheels. This pedal is brought back to its initial or inoperative position by a spring T. For greater sensitiveness of the brake-system, i. e., in order that the driver may exactly appreciate the brake-pressure prevailing in the system, said pressure is transmitted to a piston U adapted to act contrawise to the action exerted on the pedal by the driver, since that pressure prevails in the cylinder V enclosing the piston U which also prevails in pipe Q with which this cylinder is connected.

The operation of this brake-system is as follows:

Constructionally, the pressure prevailing in the conduit G is proportional to the load supported by the wheel. Therefore, a force is transmitted by piston J to lever K which is proportional to said load. In the inoperative position of pedal S the roller M has its centre coaxial the axis of the piston J; no force is then transmitted to the piston L. When the roller M is displaced by the driver depressing pedal S the lever K, by the action of the force transmitted through piston J, rocks about a roller M and lowers the piston L which then repels the balanced valve O. Thus, the fluid under pressure admitted in through conduit P can pass into conduit Q to feed the brake-operating means on the wheel. When the pressure in Q reaches a value sufficient to counterbalance the force transmitted by piston J, taking into account the ratio of leverage determined by the position of the roller M on the lever K, the valve O is forced back onto its seat, whereby the communication between P and Q is cut off.

The pressure in the conduit Q, therefore, is proportional on one hand, to the vehicle load which is represented by the pressure in pipe G and on the other hand to the depression of pedal S. As stated hereinabove, in order that the driver may exactly appreciate the pressure transmitted in the utilisation piping the latter is connected to a reaction cylinder by whose piston U a counteracting force is transmitted to the pedal which is strictly proportional to the braking pressure.

When the brake-pedal is released the roller M comes back to its initial position coaxial with piston J. The lever K thus ceases to act upon piston L and the latter is repelled by the pressure existing in Q. The fluid passes through the central bore in piston L, and thence towards the return or release conduit R.

In the arrangement diagrammatically shown, the connection between the point of application of the suspension-spring and the right-hand end of lever K is provided for by hydraulic means. This connection may also be effected by lever means with the aid of suitable reducing means. But hydraulic means are likely to be more practical. Accessorily, they may contribute to confer great flexibility to the suspension by facilitating the correction of stability of the vehicle in dependency on the load; in fact, it would be sufficient to provide for possibility of varying the volume of liquid between the two pistons E and J to cause the displacement of the zero point of the spring. As a matter of fact as the cylinder F and the axis of the torsional bar C are rigid with reference to the frame, obviously a modification in the volume of liquid filling the space between the pistons E and J produces a corresponding displacement of the piston E with reference to the normal position of the piston J and consequently a modification in the initial or zero twist of the spring bar C for a predetermined load. It is thus possible to adjust said original twist in accordance with the load to be carried.

Where helical springs C' are used as suspension means same act directly on the piston E of cylinder F (Fig. 3); in the case of leaf springs (Fig. 2) the piston E is connected to the shackle links C'' thereof.

In the case of a suspension effected by means of an elastic fluid or suspension by hydraulic means, shown in Fig. 4, it is sufficient to directly use the fluid pressure and transmit the same through a pipe G to piston J of the proportioner.

The pressure fluid is supplied to the brakes by common means that may either be submitted constantly to the action of pressure or else be submitted to such pressure only at the operative depression of the brake pedal. In Fig. 5, a pump is illustrated as forming the means for producing the desired pressure.

The arrangement shown in Fig. 1 is concerned with the brake-system for one single wheel. For a four-wheeled vehicle the brake-system normally has four proportioners controlled simultaneously by the brake-pedal. Four reaction cylinders with a respective piston U acting upon the brake-pedal are also necessary. It is sufficient to connect the four apparatuses with a common braking pipe P and to act through the pedal S on the four rollers M simultaneously through the agency of a positive mechanical connection such as a leverage of suitable design.

Practically, distribution of the braking action in dependency on the loads is quite satisfactory if extended to the whole axle. In this case, the brake-system (Figs. 5, 5a, 5b) comprises only two proportioners N' N'' (for a four-wheel vehicle) and two reaction cylinders. But the proportioners should have two pistons J located in one plane with the axis of the roller M in its inoperative position. One of the proportioners N' serves to determine the braking pressure for the front wheels and the other N'' for the rear wheels.

In the embodiment shown in Fig. 6, secured on the rear axle shaft 1 is a lever 2 connected by a link 3 to the piston 4 slidable in cylinder 5; the latter is connected by a pipe 6 to a cylinder 7 in which a piston 8 is slidably received which in turn is connected by a tie-member 9 to a second piston 10 slidable in a cylinder 11; said piston 10 is permanently urged towards the bottom of cylinder 7 by a spring 12.

A link 13 is formed with a slot 14 having a finger 15 rigid with tie-member 9 engaged therein; one of its ends is connected by a pivot pin 17 to the brake control pedal 16; the other end is provided with a roller 18 pivoted on a pin 19.

Roller 18 moves on an arcuated rocking-lever 20 having 17 for its centre.

At both ends of rocking-lever 20 a cup 21 receives a link 22 carrying a piston 23. Each of these two pistons 23 can slide in a cylinder 24 and 25.

Cylinder 24 is connected to cylinders 26 controlling the front wheel brakes through a pipe 27.

Cylinder 25 is connected to cylinders 28 controlling the rear wheel brakes through a pipe 29.

The operation is as follows:

When the rear axle 1 oscillates an amount of oil is delivered through conduit 6 into cylinder 7 by piston 4 actuated by link 3 and lever 2 which corresponds to the amplitude of the oscillation.

Through the medium of tie-member 9 piston 8 carries along, piston 10 which compresses spring 12.

Link 13 is then urged by finger 15 of tie-member 9, and swings about pin 17 of pedal 16; roller 18 moves in the arcuated race in rocking lever 20 and therefore modifies the point of application of the thrust exerted on pedal 16 and transmitted by link 13.

Now said thrust is distributed between the two cylinders 24 and 25 in reverse proportion to the distance between the point of application of said thrust and the points of contact 21 between the rocking-lever 20 and links 22.

As the oscillations of axle 1 are transmitted instantaneously to cylinder 7, link 13 swings immediately in the same proportion; thus the ratio between the lever arm and consequently between the forces applied to the pistons 23 is adjusted and constant control is ensured for all the reactions of the vehicle.

I claim:

1. A device for automatically adjusting the action of a liquid-operated pedal-controlled brake gear upon the front and the rear wheels of a vehicle in dependency on the ratio between the loads carried respectively thereby and on the absolute values of the said loads acting upon said wheels through spring gears, comprising brake shoes for each wheel, means operated by a fluid under pressure to actuate said shoes, means to control the pressure of said fluid compriing for each wheel a pair of fixed bottomless cylinders arranged side by side, pistons movable freely in said cylinders, a plate arranged at right angles above one of the bottoms of said cylinder, a free lever borne at two points on the heads of said pistons projecting from their respective cylinders, a roller guided by said plate arranged to freely move lengthwise of said free lever and to act as a fulcrum for the same, means to move said roller lengthwise of said free lever in dependency on the force exerted upon the brake pedal, means to act upon the one of said pistons with a force which is proportional to the deformation undergone by the spring gear due to the load carried by the vehicle, a balanced valve arranged within a brake-operating fluid intake chamber engaging the other piston and an aperture in the cylinder of said piston for the pipe leading the brake-operating fluid to the brake shoes.

2. A device according to claim 1 wherein the balanced valve is effective in its seated position to cut off the supply of fluid.

3. A device according to claim 1 wherein the piston that acts upon the balanced valve is formed with a longitudinal bore communicating with a fluid backflow pipe.

4. A device according to claim 1 comprising a member connected with the spring gear, a cylinder filled with fluid, a piston freely movable within said cylinder and the displacement of which is controlled by the said member, a liquid-filled pipe connecting the said cylinder with the one in which the piston is received by which the action of the spring gear is transmitted to the free lever.

5. A device according to claim 1 comprising a brake pedal, a connection between said pedal and the free lever fulcrum roller, a spring to return the pedal to its inoperative position, a cylinder communicating with the brake operating fluid pipe and a free piston within said cylinder in engagement with the said pedal.

GEORGES LEVESQUE DU ROSTU.

REFERENCES CITED

The following references are of record in the file of this patent:

UNITED STATES PATENTS

| Number | Name | Date |
|---|---|---|
| 2,169,629 | Browall | Aug. 15, 1939 |
| 2,270,366 | Wolf | Jan. 20, 1942 |
| 2,369,543 | Diurson | Feb. 13, 1945 |